July 10, 1945.                    A. KUHNS                    2,380,113
                              FLEXIBLE COUPLING
                            Filed April 12, 1943
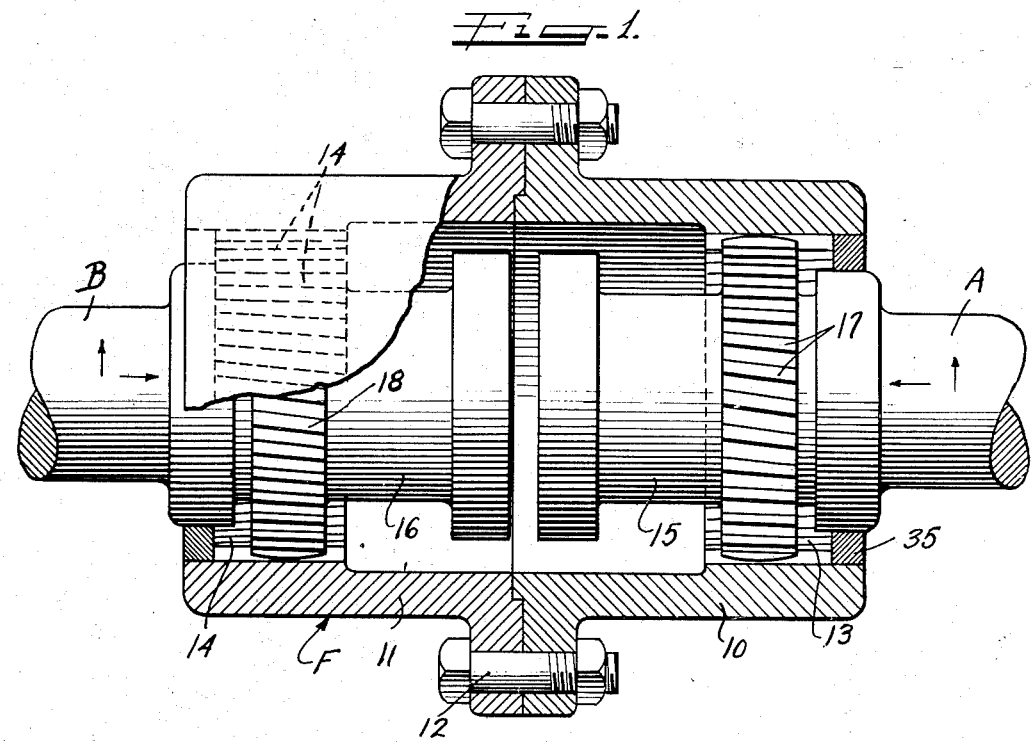
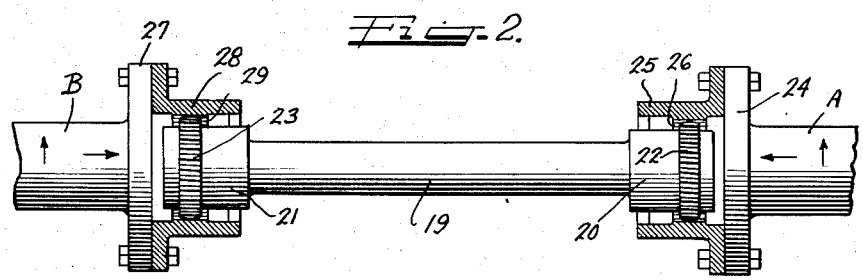
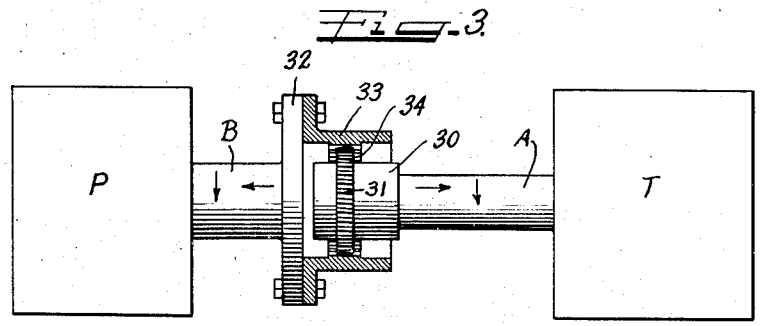
Inventor
AUSTIN KUHNS.
by Charles W Hills  Attys.

Patented July 10, 1945

2,380,113

UNITED STATES PATENT OFFICE 2,380,113

FLEXIBLE COUPLING

Austin Kuhns, Buffalo, N. Y., assignor to Farrel-Birmingham Company, Incorporated, Buffalo, N. Y., a corporation of Connecticut Application April 12, 1943, Serial No. 482,692

3 Claims. (Cl. 64—9)

My invention relates to coupling structure for aligned driving and driven shafts in which a coupling element coaxial with the shafts has teeth or parts thereon which intermesh or engage with complementary teeth or parts on the ends of the shafts. On some of these coupling structures the coupling member is in the form of a sleeve having internal teeth or parts for intermeshing or engaging with external teeth or parts on the ends of the driving and driven shafts which project into the coupling sleeve.

Where couplings of this type are interposed in the driving train between a driving source such as a turbine, motor or engine, and a driven structure such as a pump, the shafts of the driving source and the driven structure may be subjected to axial thrusts which will result in friction and decreased operation efficiency, and the important object of my invention is to so form and arrange the interengaging teeth or parts on the coupling structure that the coupling structure may counteract the axial thrusts of the shafts so as to insure smoother and more efficient operation. I accomplish this by having the interengaging teeth or parts on the coupling member and on the shafts of helical form or of suitable angle to produce the desired counterthrust when the clutch structure is in operation so that such counterthrust may be used to neutralize partially or wholly any thrust load that may be developed by either the machine on the driving shaft, or the machine on the driven shaft, or both of them together.

My improved arrangement is fully disclosed on the drawing in which:

Figure 1 is a side elevation, partly in section, of a coupling structure between two shafts, the coupling element being in the form of a sleeve or cylindrical housing;

Figure 2 shows a modified arrangement in which the coupling member is in the form of a floating shaft; and Figure 3 shows a coupling structure interposed between the shaft of a driving structure and the shaft of a driven structure.

The coupling structure shown on Figure 1 comprises a coupling frame or sleeve F which may be composed of two parts 10 and 11 secured together as by bolts 12. At its opposite ends this coupling frame has the internal teeth 13 and 14 respectively, these teeth being helical in form or at an angle with the axis of the frame, the teeth 13 and 14 all inclining or sloping in the same direction.

The shafts A and B are substantially axially aligned and terminate in hubs 15 and 16, respectively, which project into the opposite ends of the frame F. On the hub 15 are the external teeth 17 of helical form or at an angle with the axis of the shaft A, while on the hub 16 are similar teeth 18 of helical form or at an angle with the axis of the shaft B. The incline or slope of the teeth 17 and 18 is the same and the same as the incline or slope of the internal teeth 13 and 14, so that the external teeth and the internal teeth are parallel with each other with all the teeth having either right hand lead or left hand lead, the external teeth 17 meshing with the internal teeth 13 and the external teeth 18 meshing with the internal teeth 14. With this tooth arrangement and interengagement, when the coupling structure is in service the coupling frame will tend to pull the shafts toward each other or to force them away from each other depending upon the direction of rotation of the shafts. If the shaft A is the driving shaft rotated in the direction of the vertical arrow shown thereon, the frame F rotated by the teeth 17 will rotate the shaft B in the same direction as the shaft A. Engagement of the angular or inclined faces of the teeth 17 with those of the teeth 13 will tend to pull the shaft A inwardly in the direction of the horizontal arrow indicated on shaft A. The engagement of the inclined faces of the teeth 14 on the frame F with the parallel inclined faces of the teeth 18 will tend to pull the shaft B inwardly as indicated by the horizontal arrow on the shaft. Thus, if a driving structure on the shaft A and a driven structure on the shaft B tend to exert outward axial thrusts on the shafts, the coupling structure will counteract such thrusts. The magnitude of the counteracting thrust by the coupling structure is determined by the inclination or angle of lead of the interengaging teeth so that the coupling structure may be designed for counteracting any axial thrusts imposed thereon by driving or driven structures. If the direction of rotation of the shaft is reversed, then the counterthrust exerted by the coupling structure will be outwardly on the shafts A and B.

In the modified arrangement shown in Figure 2, the coupling member is in the form of a floating shaft 19 with hubs 20 and 21 at its ends having respectively the external teeth 22 and 23 which teeth are all inclined in the same direction relative to the axis of the shaft. The drive shaft A has a flange 24 at its end to which is secured the annular coupling head 25 having the internal teeth 26 inclined to parallel the external teeth 22 by which they are engaged. The driven shaft B has the flange 27 at its end to which is secured the annular coupling head 28 having the internal teeth 29 which are inclined to parallel the external teeth 23 engaged thereby. With all the teeth thus inclined to the same angle with the axis of the assembly, when the drive shaft A is driven in the direction of the arrow indicated thereon, the coupling member 19 will be rotated for driving of the shaft B in the same direction, and the cooperating inclined faces of the external and internal teeth will tend to pull the shafts A and B toward each other, and, when the direction of rotation of the driving shaft is reversed, the shafts will be urged away from each other by the interengaging parallel inclined surfaces of the teeth. Thus, any axial thrust exerted on the shafts A and B by the driving and driven structures respectively will be counteracted by the coupling structure.

Figure 3 shows a single coupling structure between the shafts A of a driving source, such as a turbine T, and the shaft B of a driven structure, such as a pump P. The shaft A terminates in a hub 30 having the external teeth 31 thereon of helical form or inclined to the shaft axis. The shaft B has the flange 32 thereon on which is mounted the annular coupling head 33 with internal teeth 34 paralleling the external teeth 31 and engaged thereby. With the tooth arrangement shown, when the shaft A is driven in the direction indicated by the arrow for drive of the shaft B in the same direction, the interengagement of the inclined teeth will tend to move the shafts A and B apart to counteract the axial thrusts of the shafts by the driving and driven structures T and P. If the driving source and the driven structure are rotated in the opposite direction and the axial thrusts on the shafts A and B thereby reversed, the clutch structure will operate to draw the shafts toward each other to counteract such axial thrusts.

The internal teeth in the coupling structures are of sufficient length to maintain full meshing engagement with the external teeth during the counterthrust movements of the clutch structure. The external teeth may be longitudinally crowned or convexed to enable limited rocking movement of the shafts relative to the coupling member, and on a coupling structure, such as shown on Figure 1, yieldable bushings 35 may be provided at the ends of the coupling member F to permit such limited rocking movement of the shafts.

I claim as follows:

1. A coupling assembly comprising a coupling member having helical teeth at its ends, shafts at the ends of the said coupling member coaxial therewith and having helical teeth meshing the teeth at the respective ends of said coupling member, all of said teeth extending longitudinally in the same direction and with the same angle relative to the axis of said assembly.

2. A coupling structure of the class described comprising a coupling sleeve having internal teeth in its ends, a driving shaft and a driven shaft extending into opposite ends of said sleeve coaxial therewith and having external teeth meshing with the teeth in the respective ends of the sleeve, all of said teeth being inclined longitudinally in the same direction and to the same angle relative to the axis of the shafts and sleeve whereby upon driving by said driving shaft through said sleeve of the driven shaft the cooperating inclined surfaces of said teeth will tend to axially shift said shafts either toward each other or away from each other in said sleeve to thereby counteract any driving thrusts on said shafts.

3. A coupling structure of the class described comprising a sleeve having helical internal teeth at its ends, a driving shaft adapted for connection with a driving source, a driven shaft adapted to be connected with a structure to be driven, said shafts extending into the sleeve ends coaxial therewith and having external helical gears thereon meshing with the internal gears at the respective ends of said sleeve, all of said helical gears having either a right hand lead or a left hand lead whereby upon rotation of the driving shaft to drive the driven shaft the cooperating surfaces on the teeth of said gears will exert either outward thrust or inward thrust on said shafts depending upon the direction of rotation of the driving shaft whereby to counteract axial thrusts on said shafts by the driving source and driven structure respectively.

AUSTIN KUHNS.